United States Patent

Wirsing et al.

[11] Patent Number: 5,953,963
[45] Date of Patent: Sep. 21, 1999

[54] CABLE-TO-LEVER CONNECTION FOR MOTION-TRANSMITTING MECHANISM

[75] Inventors: Timothy Alan Wirsing, Saginaw; Derrick V. Grahn, Troy, both of Mich.

[73] Assignee: General Motors Corporation, Detroit, Mich.

[21] Appl. No.: 09/110,309

[22] Filed: Jul. 6, 1998

[51] Int. Cl.[6] ...................................................... F16C 1/10
[52] U.S. Cl. ...................... 74/502.4; 74/502.6; 74/500.5; 74/501.5 R; 403/106
[58] Field of Search ............................ 74/500.5, 501.5 R, 74/502.4, 502.5, 502.6; 248/74.1, 56, 74.2; 24/339, 136 L, 340; 403/106

[56] References Cited

U.S. PATENT DOCUMENTS

| | | | |
|---|---|---|---|
| 4,007,647 | 2/1977 | Carlson | 74/502 X |
| 4,023,435 | 5/1977 | LaDue | 74/501 P |
| 4,805,479 | 2/1989 | Brightwell | 74/502.4 |
| 4,838,197 | 6/1989 | Watson | 116/28.1 |
| 4,841,805 | 6/1989 | Italiano | 74/500.5 X |
| 4,847,973 | 7/1989 | Lundeen | 74/502.6 X |
| 5,156,064 | 10/1992 | Truman | 74/501.5 R |
| 5,265,493 | 11/1993 | Solano et al. | 74/501.5 R |
| 5,272,934 | 12/1993 | Chegash et al. | 74/502.4 |
| 5,293,785 | 3/1994 | Lichtenberg | 74/500.5 |
| 5,295,408 | 3/1994 | Nagle et al. | 74/502.6 |
| 5,404,981 | 4/1995 | Romer et al. | 74/502.6 X |
| 5,522,276 | 6/1996 | Lichtenberg | 74/500.5 |

*Primary Examiner*—Vinh T. Luong
*Attorney, Agent, or Firm*—Charles E. Leahy; Kathryn A. Marra

[57] ABSTRACT

A motion-transmitting assembly has a cable movable within a tubular sheath anchored on a panel. A movable member, such as a lever, is movably mounted on the support and has an aperture which receives a retainer clip. The retainer clip has a cylindrical body installed into the aperture of the member and having a bore extending through the cylindrical body with yieldable fingers projecting into the bore. A cable fitting has a barrel with a bore slidably receiving the cable. A stud projects laterally from the barrel and has a circumferential groove so that upon insertion of the stud into the bore of the retainer clip, the yieldable fingers of the retainer clip engage with the circumferential groove of the cable fitting to thereby connect the cable fitting with the movable member. A ferrule is carried by the cable to engage with the barrel of the cable fitting and establish a driving connection therebetween in one direction of relative movement, while the cable is able to slide through the cable fitting and permit independent movement between the cable and the movable member in the other direction of movement. The retainer clip also has a swing-over arm extending from the cylindrical body and having a snap-fit receptacle thereon which clips onto the barrel of the cable fitting to further assure retention of the stud of the cable fitting within the cylindrical bore of the retainer clip. A stop arm is provided on the swing-over arm of the retainer clip and engages with the movable member to define a rest position of the retainer clip in readiness for insertion of the stud into the bore of the retainer clip.

4 Claims, 4 Drawing Sheets

CABLE-TO-LEVER CONNECTION FOR MOTION-TRANSMITTING MECHANISM

TECHNICAL FIELD

This invention relates to a motion-transmitting assembly of the type having a cable movable within a tubular sheath and provides an improved attachment between the cable and a lever or other movable member.

BACKGROUND OF THE INVENTION

It is well known to transmit motion between remotely situated mechanisms via a cable which is slidably guided within a tubular sheath so that the cable can be pushed and pulled. The ends of the sheath are suitably anchored on a mounting panel so that the ends of the sheath remain stationary during the push and pull motion of the cable.

The present invention provides a new and improved connection between a push-pull cable and a lever or other movable member.

SUMMARY OF THE INVENTION

A motion-transmitting assembly has a cable movable within a tubular sheath anchored on a panel. A movable member, such as a lever, is movably mounted on the support and has an aperture which receives a retainer clip. The retainer clip has a cylindrical body installed into the aperture of the member and having a bore extending through the cylindrical body with yieldable fingers projecting into the bore. A cable fitting has a barrel with a bore slidably receiving the cable. A stud projects laterally from the barrel and has a circumferential groove so that upon insertion of the stud into the bore of the retainer clip, the yieldable fingers of the retainer clip engage with the circumferential groove of the cable fitting to thereby connect the cable fitting with the movable member. A ferrule is carried by the cable to engage with the barrel of the cable fitting and establish a driving connection therebetween in one direction of relative movement, while the cable is able to slide through the cable fitting and permit independent movement between the cable and the movable member in the other direction of movement. The retainer clip also has a swing-over arm extending from the cylindrical body and having a snap-fit receptacle thereon which clips onto the barrel of the cable fitting to further assure retention of the stud of the cable fitting within the cylindrical bore of the retainer clip. A stop arm is provided on the swing-over arm of the retainer clip and engages with the movable member to define a rest position of the retainer clip in readiness for insertion of the stud into the bore of the retainer clip.

DESCRIPTION OF THE PREFERRED EMBODIMENT

Figure 1:
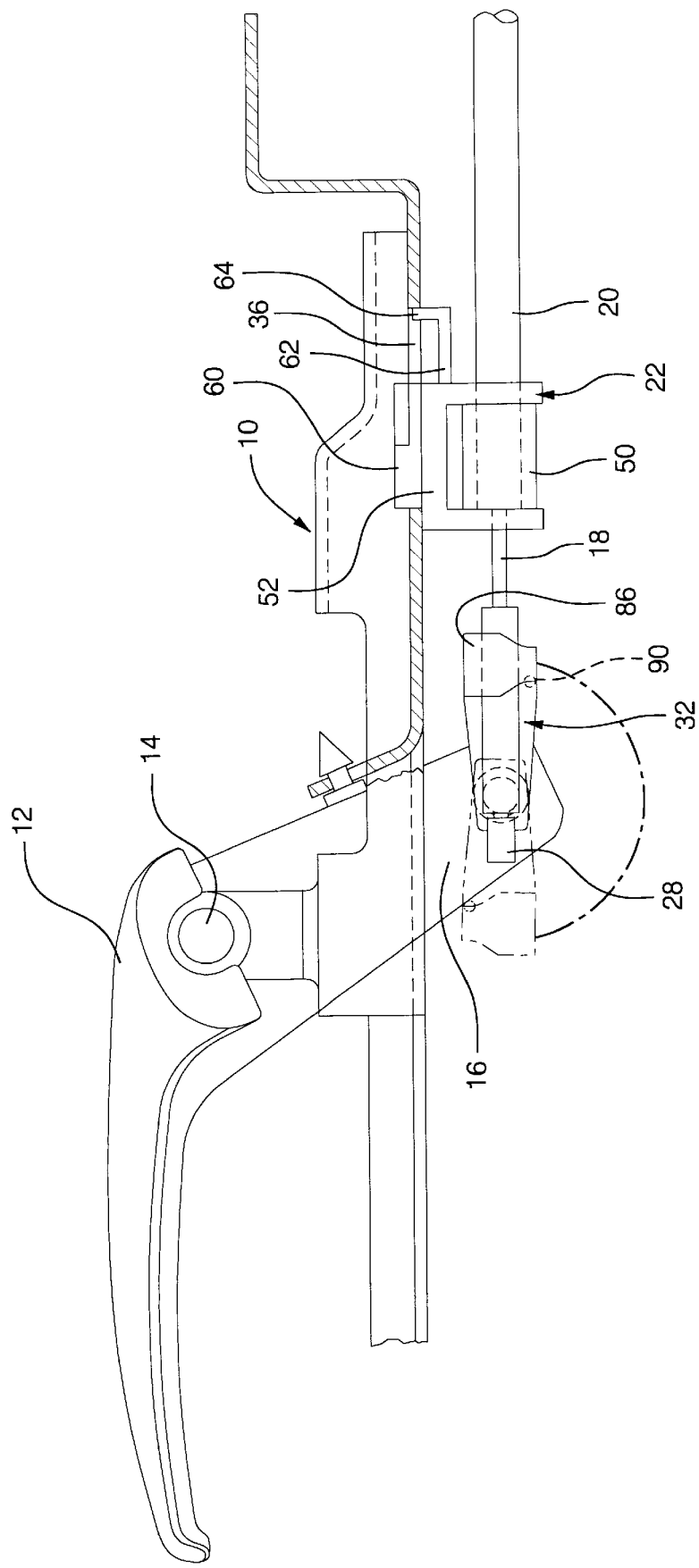
FIG. 1 is a top elevation view of the motion-transmitting assembly having the cable connected to a vehicle door handle and the sheath anchored on a mounting panel.
Figure 4:
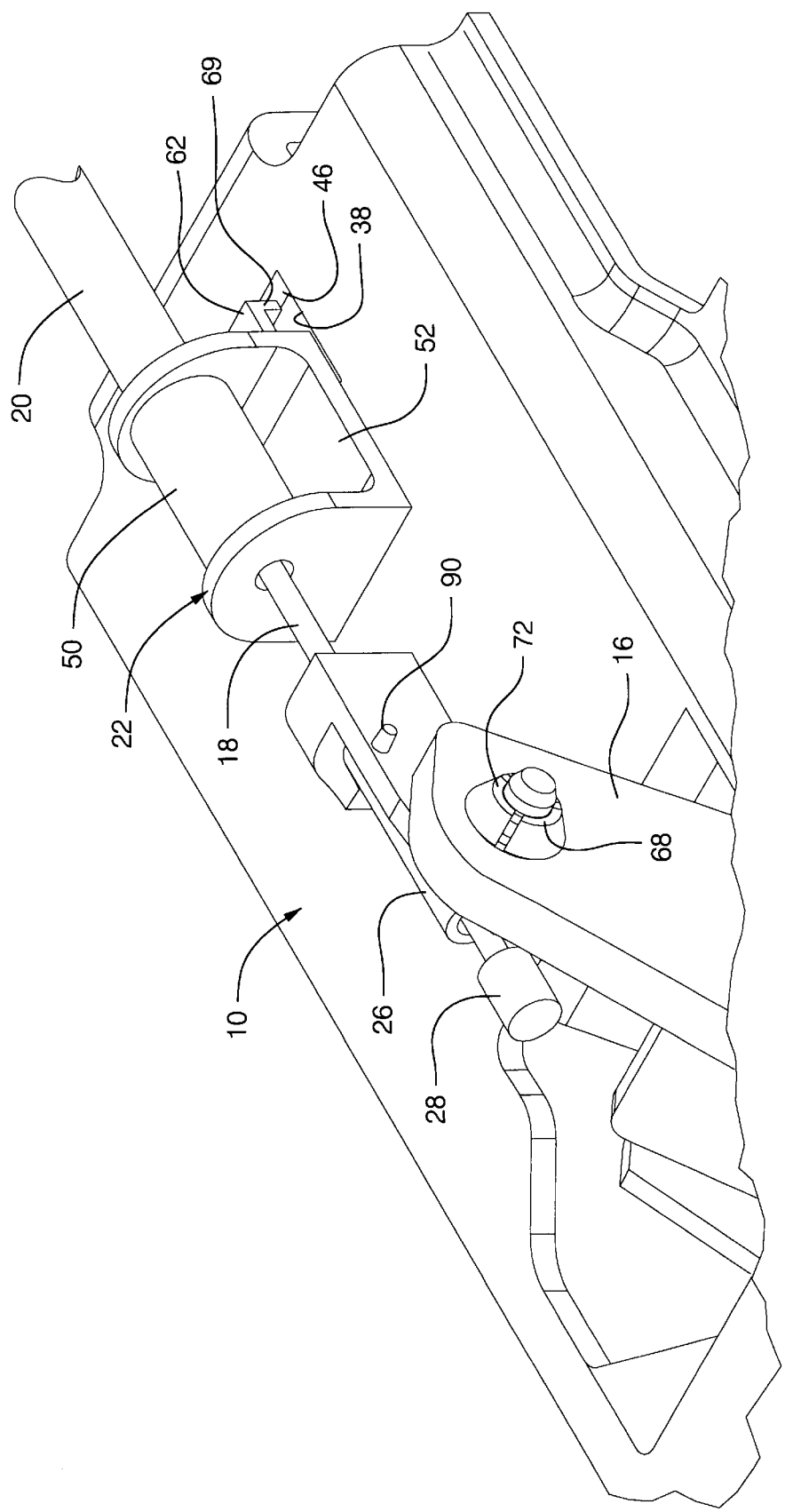
FIG. 4 shows the sheath having been anchored on the support panel by an anchor carried by the end of the sheath and also shows the cable having been attached to the lever by the retainer clip.

Referring to FIGS. 1 and 4, a mounting panel 10 of stamped steel is suitably mounted on a vehicle door, not shown. A door handle 12 is pivotally mounted on the mounting panel 10 by a pivot 14. Door handle 12 includes an actuating arm 16 which reaches inside the door for connection to a motion-transmitting mechanism which will unlatch the vehicle door latch upon pivoting of the door handle 12.

Figure 2:
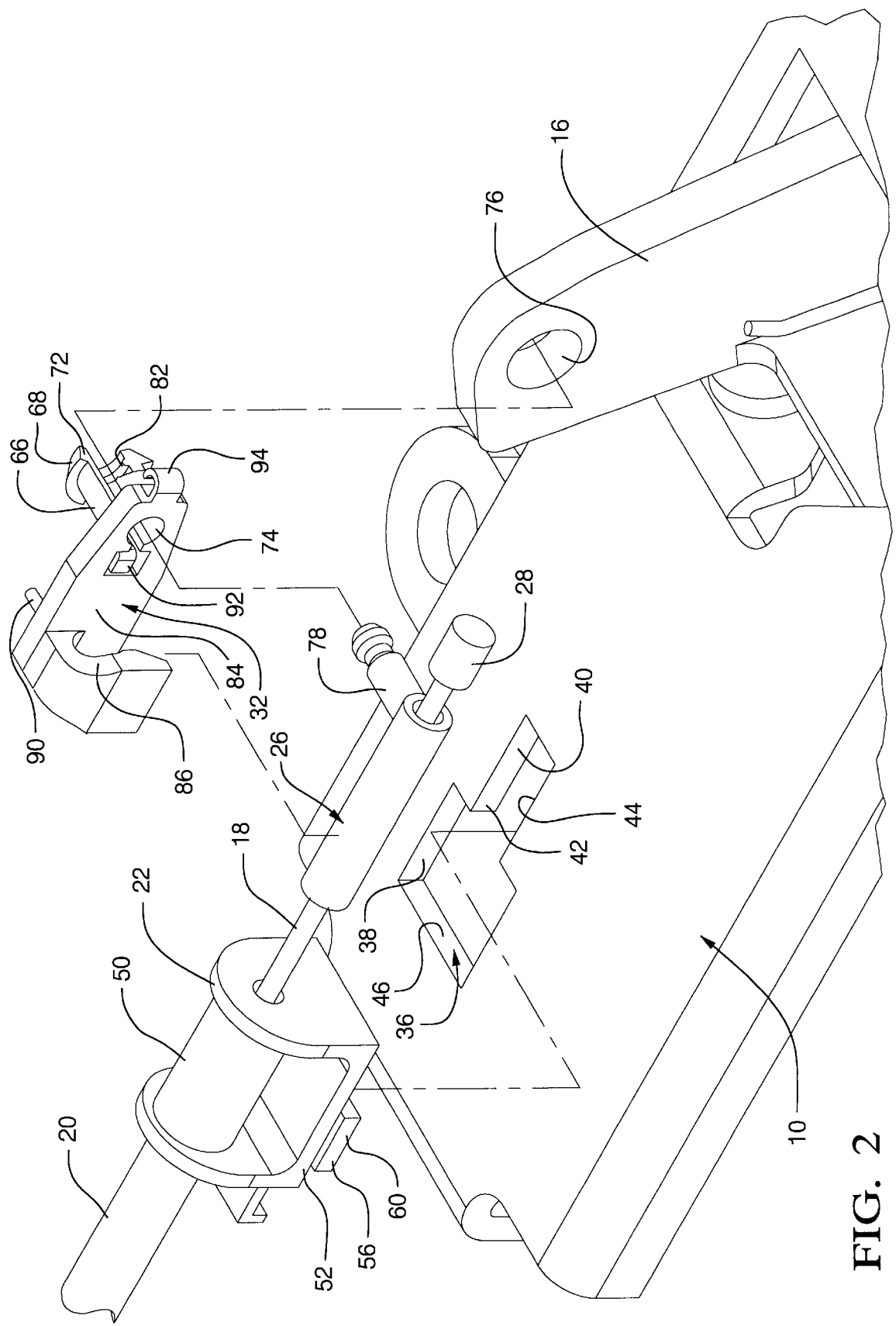
FIG. 2 is an exploded perspective view showing the components prior to their assembly.
Figure 3:
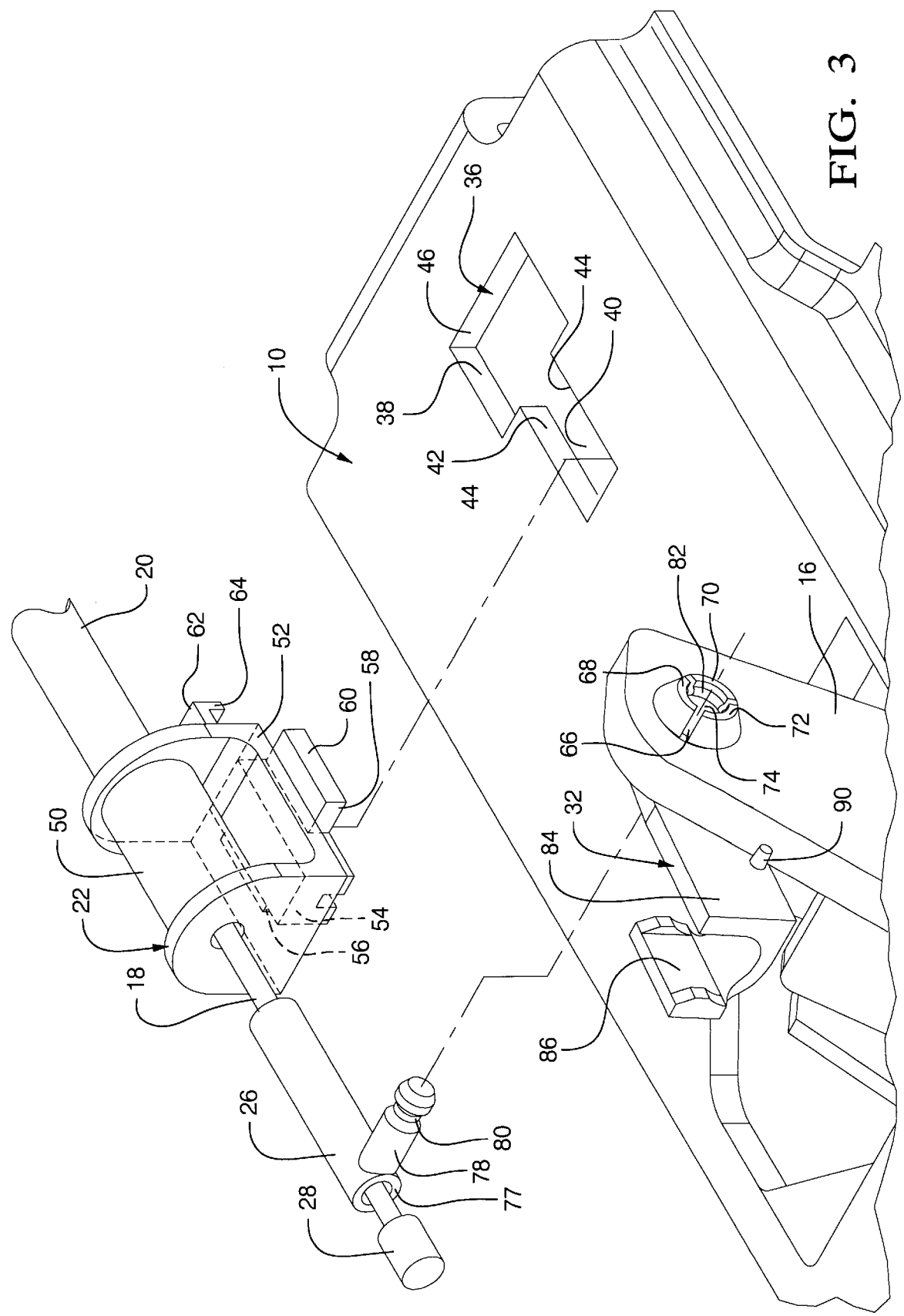
FIG. 3 shows a retainer clip installed within an aperture in the door handle lever.

The motion-transmitting mechanism includes a cable 18 which is slidable within a tubular sheath 20. The sheath 20 is anchored on the mounting panel 10 by a molded plastic anchor 22 affixed to the end of the sheath 20. As best seen in FIGS. 2 and 3, a cable fitting 26 is captured on the end of cable 18 by a ferrule 28 and is connected with the actuating arm 16 of handle 12 by a retainer clip 32.

As best seen in FIGS. 2 and 3, the mounting panel has a keyhole-shaped aperture generally indicated at 36 and including a relatively large access portion 38 and a relatively narrow slot portion 40. The slot portion is defined by parallel, shaped-apart side walls 42 and 44. The access opening portion 38 has a rear wall 46. As best seen in FIG. 3, the anchor 22 is of molded plastic construction and includes a tubular body 50 in which the sheath 20 is press fit. The anchor 22 also includes a base wall 52 having a depending shank 54 which supports lateral flanges 56 and 58 to thereby define a foot 60 suspended below the base wall 52 by the shank 54. It will be understood that the foot 60 is smaller in dimension than the access opening portion 38 of the keyhole-shaped slot 36 so that the foot 60 of the anchor 50 may be inserted into the access opening portion 38. The shank 54 is narrower than the space between the side walls 42 and 44 so that the shank includes parallel extending walls which engage with the side walls 42 and 44 of the narrow slot portion 40 to prevent the anchor 22 from rotating in the aperture 26. The anchor 22 may be slid along the panel 10, causing the shank 54 to enter the narrow slot portion 40 of the keyhole aperture 36 and the foot 60 to thereby become captured beneath the mounting panel 10.

The anchor 22 also includes an integrally-molded spring finger 62 which projects from the rear of the anchor 50 and has a locking tab 64 which becomes biased into the access opening portion 38, as best seen in FIG. 1, to block the anchor 22 against retrograde rightward movement in a direction which would permit its disengagement from the support panel. Thus, it is seen that the anchor 22 is conveniently and reliably attached to the support panel 10.

As best seen in FIGS. 2 and 3, the retainer clip 32 includes a cylindrical body 66 defined by yieldable prongs 68, 70 and 72 having a central bore 74 reaching therethrough. As seen in FIG. 3, the retainer clip 32 is installed into the arm 16 of door handle 12 by inserting the prongs 68, 70 and 72 through an aperture 76 provided in the actuating arm 16. As best seen in FIGS. 2 and 3, the cable fitting 26 includes a barrel 77 through which the cable 18 is slidable and has a stud 78 projecting laterally from the barrel 77 and having a necked-down portion 80 defining a groove. The stud 78 is pressed through the aperture 76 of the retainer clip 32 so that locking shoulders 82, which project into the bore 74 from the prongs 68, 70 and 72, become captured in the groove of the necked-down portion 80 of the stud 78, thereby retaining the stud 78 within the actuating arm 16. In addition, the retainer clip 32 has a swing-over arm 84 which reaches from the cylindrical body 66 and has a snap fit receptacle 86 thereon which becomes clipped over the barrel 77 of the cable fitting 26 when the retainer clip 32 is swung over from the rest position of FIG. 3 to the installed position of FIG. 4. Accordingly, the connection between the cable fitting 26 and the actuating arm 16 is assured by both the capture of the stud 78 within the bore 74 of the retainer clip 32 and by the receptacle 86 of the clip capturing the barrel 77 of the cable fitting 26 so that the stud 78 cannot be moved axially within the bore 74.

As seen in FIG. 3, the retainer clip 32 has a small, integrally molded stop arm 90 integrally molded on the swing-over arm 84 which rests upon the actuating arm 16 to conveniently position the retainer clip 32 in readiness for installation of the cable fitting 26. In addition, it is seen in FIG. 2 that the swing-over arm 32 carries a pair of integrally-molded spring fingers 92 and 94 which will bear lightly upon the actuating arm 60 to take up slack between the retainer clip 32 and the actuating arm 16.

It will be understood that the cable-to-lever connection shown herein is not limited to connecting the cable to a lever and can be used to connect a cable to any movable member. In addition, the movable member may be an operating member which moves the cable or an operating member which is moved by the cable.

While this invention has been described in terms of some specific embodiments, it will be appreciated that other forms can readily be adapted by one skilled in the art. Accordingly, the scope of this invention is to be considered limited only by the following claims.

We claim:

1. A motion-transmitting mechanism having a member movably mounted on a support and a cable connected to the member to establish a driving connection between the cable and the member in one direction of relative movement and free sliding movement between the cable and the member in the other direction of relative movement comprising:

an aperture in the member;

a retainer clip of yieldable plastic construction having a cylindrical body installed into the aperture of the member and having a bore extending through the cylindrical body and the retainer clip having yieldable fingers projecting into the bore;

a cable fitting having a barrel with a bore slidably receiving the cable and a stud projecting laterally from the barrel and having a circumferential groove so that upon insertion of the stud into the bore of the retainer clip, the yieldable fingers of the retainer clip engage with the circumferential groove of the cable fitting to thereby connect the cable fitting with the member; and a ferrule carried by the cable to engage with the barrel of the cable fitting and establish a driving connection therebetween in one direction of movement, and the cable is enabled to slide through the cable fitting and permit independent movement between the cable and the member in the other direction of movement so that the cable and the member are permitted to move independently of one another.

2. The motion-transmitting mechanism of claim 1 further comprising the retainer clip having a swing-over arm extending from the cylindrical body and having a snap-fit receptacle thereon which clips onto the barrel of the cable fitting to further assure retention of the stud of the cable fitting within the cylindrical bore of the retainer clip.

3. The motion-transmitting mechanism of claim 2 further comprising a stop arm provided on the swing-over arm of the retainer clip and engageable with the member to define a rest position of the retainer clip in readiness for insertion of the stud into the bore of the retainer clip.

4. The operating mechanism of claim 2 further comprising spring fingers integrally molded on the swing-over arm of the retainer clip to yieldably bear upon the member and take up slack therebetween.

* * * * *